United States Patent [19]

Isban

[11] Patent Number: 4,645,289
[45] Date of Patent: Feb. 24, 1987

[54] QUICK CONNECT POWER TAP SYSTEM

[76] Inventor: Elliot Isban, 161 Mill Rd., Stamford, Conn. 06901

[21] Appl. No.: 752,424

[22] Filed: Jul. 5, 1985

[51] Int. Cl.⁴ .......................... H01R 4/54; H01R 4/06
[52] U.S. Cl. ................................. 339/190; 339/14 R; 339/122 F
[58] Field of Search ........... 339/188 R, 189 R, 189 L, 339/190, 122 F, 197 B, 14 R, 125 R, 126 R

[56] References Cited

U.S. PATENT DOCUMENTS 3,798,584  3/1974  Person .............................. 339/14 R
3,951,488  4/1976  Hesse et al. ...................... 339/190 X
3,985,417  10/1976  Fenton ............................ 339/122 F
4,245,878  1/1981  Hall ............................. 339/188 R X

FOREIGN PATENT DOCUMENTS 2902192  7/1980  Fed. Rep. of Germany ... 339/188 R

Primary Examiner—Eugene F. Desmond
Attorney, Agent, or Firm—F. Eugene Davis, IV; Mark P. Stone

[57] ABSTRACT

The present invention provides an improvement to a coupling device which allows for quickly changing electrical fixtures without rewiring. The quick change mounting fixture comprises a combined electrical and mechanical two-piece male and female fastening device. A female receptacle plate is mounted to a standard ceiling or wall-mounted electrical junction box, and a male tap support plate which also functions as a fixture support may be selectively rotatably mounted to the female receptacle plate. Rotation of the male tap support plate through a predetermined angle with respect to the female receptacle plate automatically aligns respective live and neutral electrical contacts supported on the respective plates. The improvement comprises a ground spring electrical contact mounted to the male plate which engages the suitably grounded female plate before the male and female electrical contacts of the respective plates become electrically engaged through the rotation of the male plate relative to the female plate. The resilient force of the spring contact tends to urge the respective plates apart and therefore helps to insure snug electrical connections between the respective live and neutral electrical contacts on the male and female plates after they have been rotated into alignment.

15 Claims, 3 Drawing Figures

QUICK CONNECT POWER TAP SYSTEM

TECHNICAL FIELD AND BACKGROUND

The present invention is directed to improvements to the quick-connect power tap system of the type generally disclosed by U.S. Pat. App. Ser. No. 465,439, filed Feb. 10, 1983. The present application is a continuation-in-part of Ser. No. 465,439, currently pending before the Patent and Trademark Office, the disclosure of the aforementioned United States patent application being incorporated by reference herein in its entirety.

The system disclosed by Ser. No. 465,439 is directed to an electrical power tap system including a female electrical receptacle or socket adapted to be permanently mounted to a ceiling, or in a wall, and a male plug adapted to engage the female receptacle. In the preferred embodiment of the aforementioned patent application, supporting plates of both the receptacle and the plug carry corresponding live and neutral electrical contacts. The disclosed system is designed, and the electrical contacts are positioned, in such a manner that the respective contacts electrically engage by rotating the plug relative to the receptacle through arcuate slots defined in the lower supporting plate of the receptacle. When the plug is rotated through the entire angle provided by the slots in the receptacle plate, the respective live electrical contacts and neutral electrical contacts of the plug and receptacle will be automatically aligned. Any further rotation of the plug past this point of alignment is mechanically precluded by the device. Once the respective electrical contacts are aligned, axial movement of the plug away from the receptacle causes the respective contacts to firmly electrically engage. Such axial movement may be provided for, for example, by the weight of a fixture supported by the plug.

It is well known to the prior art that it is important that the ground connection be established before the live electrical contacts are engaged. Known prior art devices disclose different means for assuring that such ground connection will be established before other electrical connections are made.

It is an object of the present invention to provide an improved quick-connect power tap system as generally disclosed in U.S. Pat. App. Ser. No. 465,439 utilizing a ground spring contact which assures that an immediate and firm ground connection will be established and maintained before the male plug is rotated relative to the female receptacle or socket to align the respective live and neutral electrical contacts supported thereon.

It is a further object of the present invention to provide an improved quick-connect power tap system as generally disclosed in the aforementioned co-pending U.S. patent application in which a ground spring contact itself provides a resilient force to axially separate the receptacle and plug plates to assure a firm and secure engagement between the respective electrical contacts carried on those plates after the plates have been rotated so that the electrical contacts are aligned with each other.

Other objects and advantages of the present improvement will become clear from the following description of the invention.

SUMMARY OF THE INVENTION

The present invention is an improvement to electrical quick-connect power tap systems of the type including a female receptacle or socket supporting live and neutral electrical contacts, and a male plug supporting corresponding live and neutral electrical contacts adapted to be received within the receptacle and rotated with respect thereto until the respective corresponding electrical contacts on the receptacle and the plug are brought to alignment with each other. The electrical contacts on the plug and receptacle are arranged such that after the corresponding contacts are rotated into alignment with each other, relative axial movement of the plug with respect to the receptacle causes the corresponding respective electrical contacts to securely and firmly engage with each other. The improvement comprises a ground contact carried on the male plug and adapted to engage the supporting plate of the female receptacle, which is also suitably grounded, immediately after the plug is inserted into the receptacle and before the plug is rotated relative to the receptacle plate. In this manner, the ground connection is established before any other electrical connections are made. The entire receptacle plate is grounded to insure that the initial ground connection will be established as long as the ground spring contact engages against any portion of the receptacle plate. That is, the ground spring need not engage against any specific corresponding ground contact on the receptacle and therefore the ground spring need not be manufactured with any precise tolerance. Moreover, the use of a ground spring exerts a resilient force urging the plug away from the receptacle in an axial direction. The resilient force exerted by the ground spring urges the respective corresponding electrical contacts carried on the plug and the receptacle into a firm and secure electrical engagement with each other when these respective contacts are rotated into alignment with each other. Accordingly, the spring action of the ground spring results in the desired secure engagement of the corresponding electrical contacts of the plug and the receptacle. Additionally, the continuous force exerted by the ground spring assures that the ground connection itself will be securely maintained.

DESCRIPTION OF THE BEST MODE FOR CARRYING OUT THE INVENTION

The present invention is an improvement to the quick-connect power tap system which is generally disclosed and illustrated in co-pending U.S. Pat. App. Ser. No. 465,439, filed on Feb. 10, 1983. The disclosure of this co-pending patent application is incorporated by reference herein in its entirety, and the present application is a continuation-in-part thereof.

Figure 1:
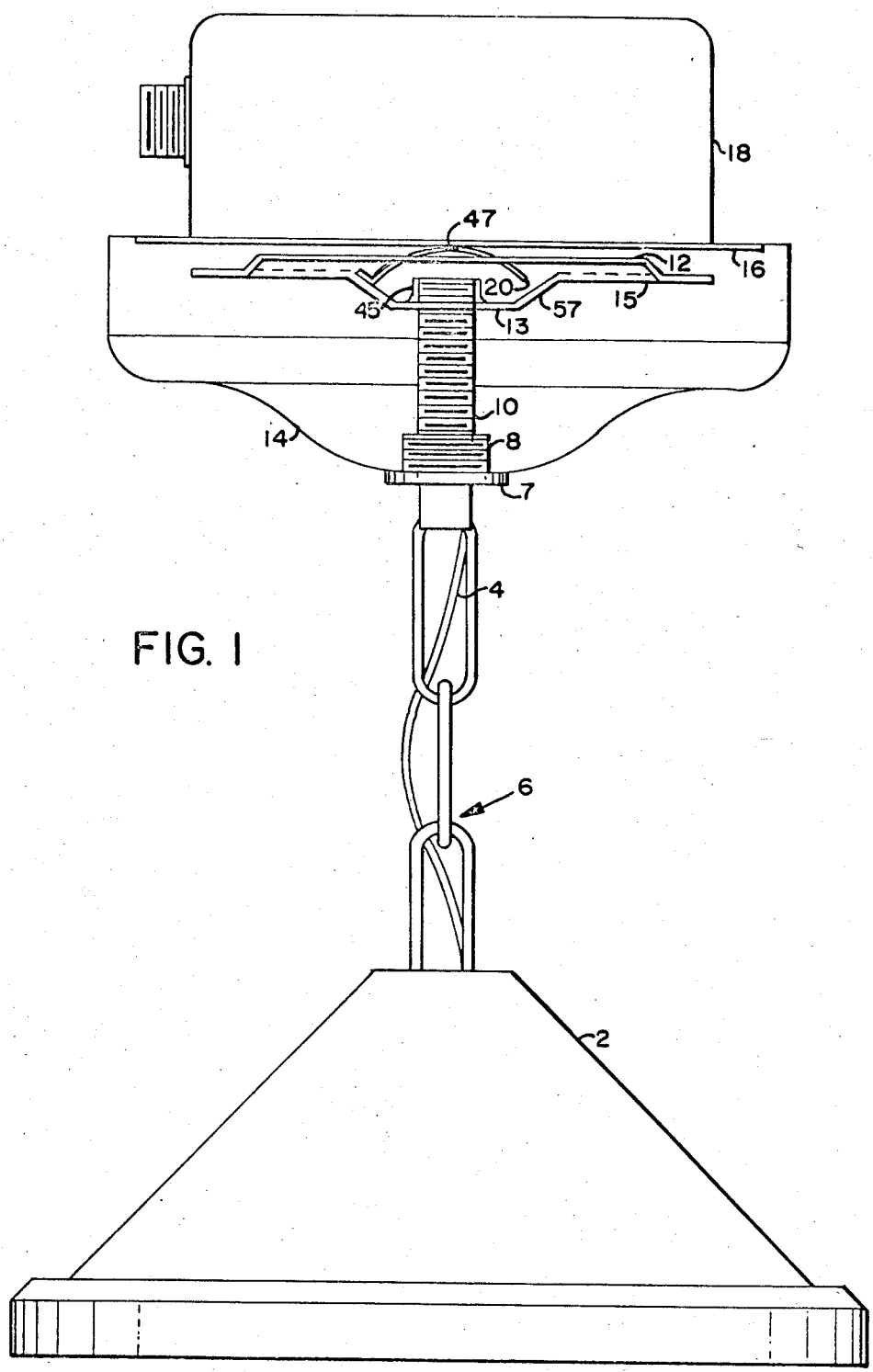
FIG. 1 of the drawings illustrates a diagramatic side view of an electrical fixture installed with the improved quick-connect power tap system of the present invention.
Figure 2:
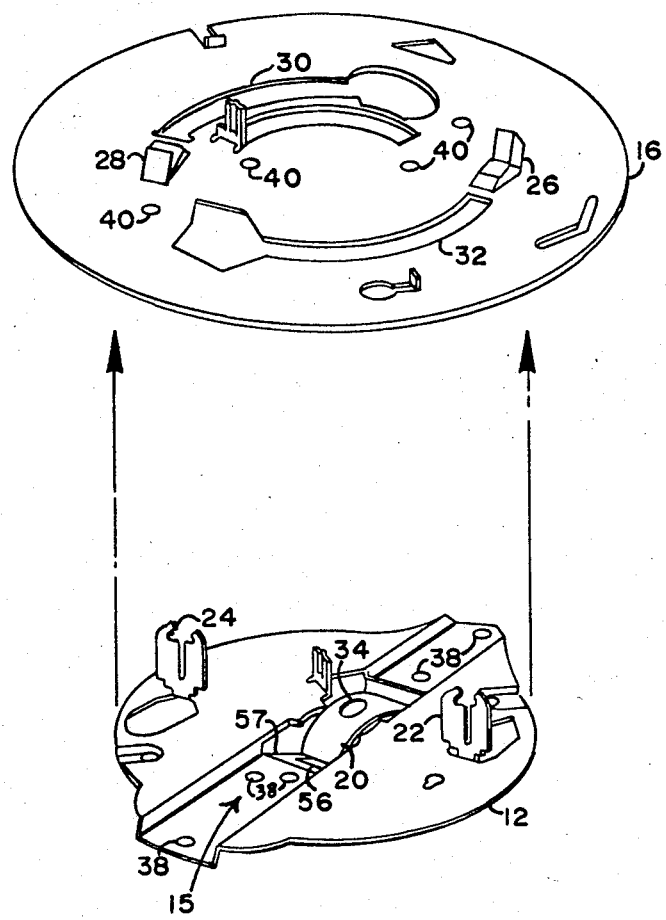
FIG. 2 is a perspective view of the supporting plates for the female socket or receptacle and male plug of the present invention, showing the ground spring carried on the plug plate, before the receptacle and plug are assembled as shown in FIG. 1.
Figure 3:
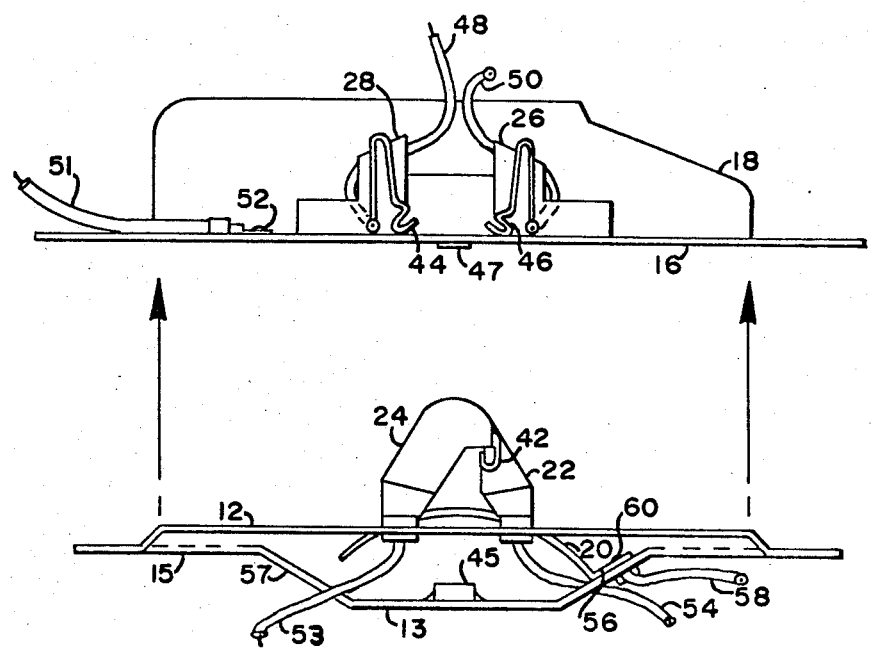
FIG. 3 is a sectional view of the improvement of FIG. 1 illustrating the specific electrical connections to the receptacle and the plug.

FIGS. 1–3 of the drawings illustrate the improvement of the present invention which, in its broadest aspect, advantageously uses a ground spring to establish and maintain an initial ground connection. Referring first to FIG. 1 of the drawings, this figure illustrates generally an assembled quick-connect power tap system as disclosed in the co-pending application employing the ground spring improvement of the present application. A hanging fixture 2 is electrically connected to a three-wire cable 4 which is laced through a chain 6. The chain is mechanically connected at its lower end to the fixture 2. The upper end of the chain is mounted to a canopy 14 by a screw collar 7, a loop 8 having an outer threaded surface, and a threaded nipple 10, as is conventional in the art and more fully explained in the aforementioned co-pending U.S. patent application.

Still referring to FIG. 1 of the drawings, a supporting plate for a plug is generally designated by reference numeral 12. The plate 12 includes a central channel 15 (better seen in FIG. 2), and a recessed portion designated by reference numeral 13 defined at the center of the channel 15. A sleeve 45 extends upwardly from the recessed portion 13 for receiving the top of the nipple 20 through a suitably provided opening in portion 13 when fixture 2 is mounted to the plug plate.

An opposed receptacle plate 16 defines the lower portion of a female receptacle or socket which is generally enclosed within a junction box 18. The receptacle is mounted within a ceiling or wall and is electrically coupled to a power source, as is well known in the art. An arcuate ground spring generally designated by the reference numeral 20, as will be more fully described hereinafter, is mounted to the plug plate 12 in the channel 15. A portion of the ground spring 20 extends above the upper surface of plug plate 12 and abuts against the front surface of receptacle plate 16 when the plug plate is mounted to the receptacle as shown in FIG. 1.

FIG. 2 of the drawings illustrates the plug plate 12 and the receptacle plate or socket 16 in perspective before these two plates are assembled as shown in FIG. 1. Referring first to the plug plate 12, it is readily seen that support members 22 and 24 for respectively supporting live and neutral electrical contacts (not shown in FIG. 2) extend upwardly from the upper surface of the plate 12. Corresponding support members 26 and 28 for corresponding live and neutral electrical contacts extend upwardly from the upper surface of receptacle plate 16. The receptacle plate 16 further defines two concentric slots designated by reference numerals 30 and 32. As more fully described and explained in co-pending U.S. Pat. App. Ser. No. 465,439, the live and neutral electrical contacts on plug plate 12 are received within the respective wider portions defined at the front edge of slots 30 and 32. Thereafter, the plug is rotated relative to the receptacle plate through the grooves 30 and 32 with the lower portions of the supports 22 and 24 being received within the narrower portions of the slots 30 and 32. The plug remains coupled to the receptacle plate by virtue of the configuration of the supports 22 and 24, the lower surface of the wider portions of such supports being wider than the narrow portions of the slots 30 and 32. The plates 12 and 16 are designed such that when the plug plate 12 is rotated through the full extent permitted by the slots 30 and 32, the respective live and neutral electrical contacts carried by plate 12 are in axial alignment with the corresponding live and neutral electrical contacts carried on the upper surface of receptacle plate 16. After such alignment occurs, an axial force is applied to separate the plates 12 and 16 so as to result in a firm and secure electrical engagement between the respective electrical contacts carried by the plug and the electrical contacts carried by the receptacle. More specific details relating to the relationshipo between the plug and the receptacle, and the manner in which the plug is removably mounted to the receptacle, are discussed in co-pending U.S. Pat. App. Ser. No. 465,439 to which reference is made.

Still referring to FIG. 2, the arcuate ground spring 20 is shown mounted in the recessed portion 13 of the channel 15 defined on the upper surface of the plug plate 12. As discussed before, the apex of the ground spring 20 extends above the upper surface of the plate 12. As is also apparent from FIG. 2, an opening 34 is defined in the ground spring 20 at its apex. The purpose of this opening 34 will be discussed below. Openings 38 defined in the channel 15 of the plug plate 12 are aligned with openings 40 defined on the receptacle plate 16 when the plug is mounted to the receptacle and rotated into its operative position and illustrated in FIG. 1. The purpose of these aligned openings is to provide means, as for example screws or wing nuts, for further securing the plates 12 and 16 together after plug plate 12 has been rotated into its operative position.

FIG. 3 of the drawings is similar to FIG. 2 in that it shows a cross-section of the plug plate 12 and the receptacle plate 16 before the plug is mounted to the receptacle. However, FIG. 3 illustrates the specific electrical connections of the quick-connect power tap system of the present improvement. The neutral electrical contact carried on the support 28 extending from the upper surface of the receptacle plate is designated as reference numeral 44, and wire or lead 48 is electrically connected thereto. Likewise, the live electrical contact carried on support 26 extending upwardly from the receptacle plate 16 is designated by reference numeral 46, and live wire 50 is electrically coupled thereto. A ground wire 51 is electrically connected to the upper surface of the receptacle plate 16 by a clamp designated as reference numeral 52. The entire receptacle plate 16 is grounded.

Still referring to FIG. 3, the neutral electrical contact housed within the supporting member 24 carried by the upper surface of the plug plate 12 is designated by the reference numeral 42. A similar live electrical contact (not shown in FIG. 3) is carried by the supporting member 22 also carried by the upper surface of the plug plate 12. Electrical wires 53 and 54 are connected respectively to the neutral and live electrical contacts carried by the plug plate.

As more fully explained in co-pending application Ser. No. 465,439, the respective electrical contacts carried by the plug and receptacle plates are configured such that the contacts on the plug plate are firmly and securely received within the contacts on the receptacle plate after the plug has been rotated through the slots 30 and 32 (FIG. 2) so that the corresponding contacts on the plug have been rotated into axial alignment above the contacts on the receptacle. Thereafter, an axial force applied to separate the plug and receptacle plates causes the plug contacts to be dropped into and received within the corresponding receptacle contacts.

Still referring to FIG. 3, the arcuate ground spring 20 is shown mounted to the plug plate 12. The ground spring 20 also includes a generally perpendicular tab portion 56. The tab 56 is mounted to a ramp portion 57 which connects the channel portion 15 of the receptacle plate 12 to the recessed portion 13 defined in the center of the channel. The tab 56 is mechanically coupled to the ramp 57 by known mounting means 60, as for example a clamp or bolt, and a ground wire 58 is electrically connected to the tab.

As is clear from FIG. 3, the ground spring 20 is mounted such that its apex portion which extends above the upper surface of the receptacle plate 12 is generally centered with respect to the recessed portion 13 of the channel 15. As noted with respect to FIG. 2, an opening 34 is defined at the apex of the ground spring 20. A metallic bumper or protuberance, designated as reference numeral 47 in FIG. 3, extends downwardly from the lower surface of receptacle plate 16 and opposes the plug plate 12. The protuberance 47 is configured and positioned so that it will be received within the opening 34 in the ground spring when the plug is inserted into the receptacle as illustrated by FIG. 1. The function of this protuberance 47 is to act as a guide during the rotation of the plug relative to the receptacle and also to help secure the ground spring 20 in a fixed position relative to the receptacle plate 16 when the plug is mounted to the receptacle. That is, the protuberance 47 will prevent the ground spring from slipping along the lower surface of the plate 16 to assure that the ground spring will be maintained in compression. Preferably, the proturberence 47 is formed from an electrically conductive material such as the head of a bolt or screw received in the receptacle plate.

The use of a ground spring in the present invention is advantageous in many respects. Because the apex portion of the ground spring extends above the upper surface of the plug plate 12, it is the first element to engage the receptacle plate 16 after the electrical contacts on the plug plate have been inserted into the wider portions of the grooves 30 and 32 on the receptacle plate but before the plug is rotated. Since the entire receptacle plate is grounded, a ground connection is immediately established as soon as the ground spring contacts any portion of the receptacle plate, which will occur long before any electrical connections are made. This important safety aspect of the present invention is enhanced because the ground spring itself provides a relatively wide surface area with which to contact any portion of the receptacle plate. In the preferred embodiment of the invention, the ground spring has a width of approximately ½ inch, the plug plate has a width of approximately 3 inches, and the receptacle plate has a diameter of about 5 inches. The ground is also the last electrical connection to be broken when the plug is dismounted from the receptacle thereby assuring safe removal of the plug.

Additionally, the relationship between the opening 34 defined on the apex of the ground spring and the protuberance 47 extending from the lower surface of the receptacle plate 16 acts as a guide during the mounting of the plug to the receptacle. As noted above, the protuberance 47 will be received in the opening 34 when the electrical contacts carried on the upper surface of the plug plate are initially inserted into the wider portions of the grooves 30 and 32. Once the protuberance 47 is received within the opening 34, the protuberance acts as a guide and allows the plug plate to be rotated relatively quickly with respect to the receptacle without the possibility of slippage or misalignment provided that sufficient force is applied to the plug plate to maintain the protuberance 47 within the opening 34.

As noted above, the ground spring provides a relatively large surface area for the ground contact, and the entire receptacle plate 16 is grounded. Accordingly, the use of the ground spring avoids the necessity of precisely aligning respective ground contacts carried on plugs and receptacles which is now common to the prior art. Moreover, once the initial ground is established, the resilient force exerted by the spring assures the continued and firm engagement of the ground contact 20 with the grounded receptacle plate 16.

As discussed above, the device of the present invention establishes electrical connections between the respective electrical contacts on the plug and receptacle by rotating the contacts on the plug into alignment above the respective electrical contacts carried on the receptacle plate 16. When such alignment is achieved, an axial force is applied to separate the plug and receptacle plates so as to cause the plug electrical contacts become firmly received within the receptacle electrical contacts. In co-pending U.S. Pat. App. Ser. No. 465,439, such axial force is applied by the turning of wing nuts received in the plug plate having ends abutting against the lower surface of the receptacle plate. By turning the wing nuts in a predetermined direction of rotation, the plug plate and receptacle plate are axially separated. Additionally, the weight of the fixture suspended from the plug also helps to provide the required axial force. In the improvement provided herein, at least a portion of this axial force is provided by the resilient force of the ground spring 20. As described herein, the apex of the ground spring abuts against the lower surface of the receptacle plate 16. The force of the spring urges the plug plate 12 away from the receptacle plate 16 in an axial direction. Accordingly, the ground spring itself advantageously supplements the axial force necessary to assure firm and secure electrical connections between the respective electrical contacts of the plug and the receptacle.

It is apparent that the use of a ground spring in the quick-connect power tap system described herein is advantageous in many respects and the ground spring itself performs several different functions. As discussed, the ground spring provides a wide contact area to assure that a ground is initially and immediately established before any other electrical connections are made. The ground spring itself serves as a guide during the rotatable mounting of the plug to the receptacle, and the resilient force of the ground spring also assures that the ground connection will be maintained once it is established. The use of the ground spring also provides or supplements the axial force urging the receptacle and plug plates away from each other in order to establish and maintain the electrical connections between the respective electrical contacts carried by both the plug and the receptacle.

It is also noted that the upper surface of the ground spring, which engages the receptacle plate 16, is advantageously subject to a wiping action during rotation of the plug relative to the receptacle to assure good electrical contact between the spring and that plate by scraping oxidation from contact surfaces.

The ground spring employed in the preferred embodiment of the invention is formed from an electrically conductive material, as for example, spring tempered metal such as cartridge brass. It is preferably configured in an arcuate shape. However, other types of conductive resilient materials may be employed in the present invention. Additionally, although the ground spring in the preferred embodiment of the invention is mounted to the plug plate, it may, in alternate embodiments still within the scope of the present invention, be mounted to the receptacle or socket plate.

Accordingly, the discussion of the preferred embodiment herein is intended to be illustrative only and not limiting to the scope of the invention, that scope being defined by the following claims and all equivalents thereto.

I claim:

1. In an electrical quick connect power tap system including two electrical components adapted to be removably mounted to each other, one of said components being a socket adapted to being connected to a source of electrical power, the other of said components being a plug adapted to being connected to a load, said components each including a plurality of corresponding electrical contacts which are placed in axial alignment with each other by relative movement of said plug and said socket, the improvement comprising:

a ground spring mounted to one of said electrical components such that said ground spring engages with the other of said electrical components to establish a ground connection before said corresponding electrical contacts are moved into axial alignment with each other, said plug including a plug plate and said ground spring being mounted to said plug plate such that at least a portion of said ground spring extends beyond the plane of said plug plate, said socket including a socket plate, said socket and said plug plates being opposed to each other when said plug is mounted to said socket, said portion of said ground spring extending beyond said plane of said plug plate having an opening defined thereon, said socket plate having a member extending therefrom and adapted to be received in said opening in said ground spring when said plug is mounted to said socket.

2. The improvement of claim 1 wherein said ground spring is arcuate.

3. The improvement of claim 1 wherein said ground spring is arcuate, the apex of said ground spring being the portion thereof extending beyond the plane of said plug plate.

4. The improvement of claim 1 wherein said ground spring exerts a resilient force urging said plug and said socket apart when said plug is mounted to said socket.

5. The improvement of claim 1 further including means for grounding said socket plate so that a ground connection is established when said ground spring engages any portion of said socket plate.

6. The improvement of claim 1 wherein said ground spring is formed from brass.

7. The improvement of claim 1 wherein said ground spring exerts an axial force urging said plug and socket apart when said corresponding electrical contacts are moved into alignment with each other to secure said corresponding electrical contacts into engagement with each other.

8. In an electrical quick connect power tap system including a socket having electrical contacts adapted to being connected to a power source, a plug having corresponding electrical contacts, and means for rotatably mounting said plug to said socket for axially aligning said corresponding electrical contacts, the improvement comprising:

a ground spring mounted to said plug and adapted to contact said socket to establish a ground connection before said corresponding electrical contacts are rotated into alignment with each other, said socket including a socket plate opposed to said plug when said plug is mounted to said socket, and means for grounding said socket plate such that contact between said ground spring and any portion of said socket plate establishes a ground connection, said plug including a plug plate and said ground spring being mounted to said plug plate so that at least a portion of said ground spring extends beyond the plate of said plug plate to initially make contact with said socket plate when said plug is mounted to said socket, said ground spring exerting a resilient force urging said socket and said plug axially apart from each other, said socket plate having a member extending therefrom which is adapted to be received in an opening defined in said ground spring when said plug is mounted to said socket to secure said ground spring in a fixed position relative to said socket plate.

9. The improvement of claim 8 wherein said ground spring is arcuate.

10. The improvement of claim 8 wherein said resilient force exerted by said ground spring maintains firm contact between said ground spring and said socket plate.

11. The improvement of claim 8 wherein said resilient force exerted by said ground spring urges said corresponding electrical contacts into engagement with each other when said corresponding electrical contacts are rotated into alignment with each other.

12. The improvement of claim 8 wherein said ground spring wipes against said socket during said rotation of said plug relative to said socket.

13. An electrical plug adapted to being rotatably mounted to a grounded electrical socket, said plug and said socket having corresponding electrical contacts which are rotated into axial alignment with each other, said plug including a ground spring extending therefrom and adapted to engage said socket to establish a ground connection and to exert a resilient force thereagainst for urging said socket and said plug apart, said ground spring defining an opening therein, said opening being adapted to receive a member extending from said socket when said plug is mounted to said socket for securing said ground spring in a fixed position relative to said socket.

14. The electrical plug of claim 13 wherein said ground spring wipes against said socket during said rotation of said plug relative to said socket.

15. In an electrical quick connect power tap system comprising two electrical components adapted to be removably mounted to each other, said electrical components including a socket adapted to being connected to a source of electrical power and a plug adapted to being connected to a load, said electrical components each including a plurality of corresponding electrical contacts which are placed in axial alignment with each other by relative movement of said plug and said socket, the improvement comprising:

a ground spring mounted to one of said electrical components such that said ground spring engages with the other of said electrical components to establish a ground connection before said corresponding electrical contacts engage;

said ground spring defining an opening therein, and
   a member extending from said other of said electrical components and being adapted to be received within said opening in said ground spring when said two electrical components are in axial alignment with each other.

* * * * *